(12) United States Patent
Claypool et al.

(10) Patent No.: US 11,405,684 B1
(45) Date of Patent: Aug. 2, 2022

(54) DISTRIBUTED MEDIA PLAYER FOR DIGITAL CINEMA

(71) Applicant: CHRISTIE DIGITAL SYSTEMS USA, INC., Cypress, CA (US)

(72) Inventors: Brian Claypool, Seal Beach, CA (US); Kevin Draper, New Hamburg (CA); John Hudson, Waterdown (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 0 days.

(21) Appl. No.: 17/144,539

(22) Filed: Jan. 8, 2021

(51) Int. Cl.
| | | |
|---|---|---|
| *H04N 7/16* | (2011.01) | |
| *H04N 21/4385* | (2011.01) | |
| *H04N 9/31* | (2006.01) | |
| *H04L 9/40* | (2022.01) | |
| *H04N 21/8358* | (2011.01) | |
| *H04N 21/436* | (2011.01) | |

(52) U.S. Cl.
CPC ... *H04N 21/43853* (2013.01); *H04L 63/0457* (2013.01); *H04N 9/31* (2013.01); *H04N 21/436* (2013.01); *H04N 21/8358* (2013.01)

(58) Field of Classification Search
CPC .......... H04N 21/43853; H04N 21/436; H04N 21/8358; H04N 9/31; H04L 63/0457
See application file for complete search history.

(56) References Cited

U.S. PATENT DOCUMENTS

| | | | |
|---|---|---|---|
| 6,812,994 B2 | 11/2004 | Bubie et al. | |
| 7,653,921 B2* | 1/2010 | Herley | H04N 21/4756 725/19 |
| 7,913,326 B1* | 3/2011 | Barrows | A61F 9/022 2/450 |
| 8,121,295 B1 | 2/2012 | Everson et al. | |
| 8,510,770 B1* | 8/2013 | Oztaskent | H04H 60/72 725/21 |
| 2008/0049704 A1* | 2/2008 | Witteman | H04H 60/58 370/342 |
| 2008/0082510 A1* | 4/2008 | Wang | H04H 60/40 |
| 2009/0313670 A1* | 12/2009 | Takao | H04N 21/47 725/110 |
| 2010/0114713 A1* | 5/2010 | Anderson | G06Q 40/12 705/14.69 |

(Continued)

OTHER PUBLICATIONS

Jeong, Yeonjeong et al. "Design of KDM system for Digital Cinema." 2010 The 12th International Conference on Advanced Communication Technology (ICACT). vol. 2. IEEE, 2010.

(Continued)

*Primary Examiner* — Michael B. Pierorazio
(74) *Attorney, Agent, or Firm* — Perry + Currier Inc.

(57) ABSTRACT

Devices, systems and methods for distribution of digital content are set forth, wherein a distributed media player is provided comprising a a central playout server having a multiplexed media processing block within a tamper-responsive enclosure, the central playout server having a first input for receiving at least one decryption key and a second input for receiving media data from a content provider in response to which the multiplexed media processing block decrypts the media data using the at least one decryption key and transmits the decrypted media data over a local network to a plurality of devices as an encrypted data stream.

13 Claims, 3 Drawing Sheets

(56) References Cited

U.S. PATENT DOCUMENTS

| | | | |
|---|---|---|---|
| 2011/0071838 A1* | 3/2011 | Li-Chun Wang | G10L 19/018 704/270 |
| 2011/0235801 A1 | 9/2011 | Peterka et al. | |
| 2011/0273455 A1* | 11/2011 | Powar | G10H 1/368 345/473 |
| 2011/0283319 A1* | 11/2011 | Davis | H04N 21/233 725/39 |
| 2012/0295560 A1* | 11/2012 | Mufti | H04B 13/00 455/95 |
| 2012/0297400 A1* | 11/2012 | Hill | G06F 16/748 719/318 |
| 2012/0316969 A1* | 12/2012 | Metcalf, III | G06Q 30/0269 705/14.66 |
| 2013/0029762 A1* | 1/2013 | Klappert | A63F 13/792 463/31 |
| 2013/0031579 A1* | 1/2013 | Klappert | H04N 21/454 725/32 |
| 2013/0042262 A1* | 2/2013 | Riethmueller | H04N 7/17318 725/14 |
| 2013/0044051 A1* | 2/2013 | Jeong | H04N 21/485 345/156 |
| 2013/0067512 A1* | 3/2013 | Dion | G06Q 30/02 725/34 |
| 2013/0073366 A1* | 3/2013 | Heath | G06Q 30/0259 705/14.25 |
| 2013/0073377 A1* | 3/2013 | Heath | G06Q 30/02 705/14.39 |
| 2013/0080242 A1* | 3/2013 | Alhadeff | G06Q 30/0239 705/14.39 |
| 2013/0080262 A1* | 3/2013 | Scott | G06Q 30/02 705/14.68 |
| 2013/0085828 A1* | 4/2013 | Schuster | G06Q 50/01 705/14.25 |
| 2013/0111519 A1* | 5/2013 | Rice | G06Q 30/02 725/34 |
| 2013/0124073 A1* | 5/2013 | Ren | G08G 1/0112 701/118 |
| 2013/0132729 A1 | 5/2013 | Arnold et al. | |
| 2014/0115761 A1* | 5/2014 | McNeal | G02C 5/122 2/439 |
| 2014/0196070 A1* | 7/2014 | Moskowitz | H04N 21/8456 725/19 |
| 2015/0082349 A1* | 3/2015 | Ishtiaq | H04N 21/4884 725/40 |
| 2015/0143416 A1* | 5/2015 | On | H04N 21/44016 725/34 |
| 2015/0216710 A1* | 8/2015 | Wanderer | A61F 5/08 128/858 |
| 2015/0222950 A1* | 8/2015 | Sant | H04N 21/25883 725/18 |
| 2015/0229979 A1* | 8/2015 | Wood | H04N 21/2407 725/14 |
| 2018/0184160 A1* | 6/2018 | Cain | H04N 21/8358 |
| 2019/0007729 A1* | 1/2019 | Heffernan | H04H 60/45 |
| 2019/0130136 A1* | 5/2019 | Claypool | H04N 21/26613 |

OTHER PUBLICATIONS

Digital Cinema Initiative, "DCI Digital Cinema System Specification", v. 1.4, DCImovies.com, Jul. 20, 2020.

Dolby, "Dolby Laboratories and Christie Digital Proposal for Remote Media Block Support in the Digital Cinema System Specification", Business Wire, Sep. 30, 2013.

* cited by examiner

DISTRIBUTED MEDIA PLAYER FOR DIGITAL CINEMA

FIELD

The present description relates to digital cinema, and in particular to a distributed media player having a central playout server for ingesting and watermarking media data received from a content provider, and a plurality of display devices each including a decoder for receiving and decrypting the media data from the central playout server.

BACKGROUND

Movies are distributed in digital form, with movie data distributed as a Digital Cinema Package (DCP), which is a hierarchical file structure that represents a "composition" (i.e. movie or portion thereof). The composition consists of a Composition Playlist (in XML format) that defines the playback sequence of a set of track files. Track files carry the essence of the content. Two track files at a minimum must be present in every composition: a track file carrying picture essence, and a track file carrying audio essence. The composition, consisting of a composition playlist and associated track files, are distributed as a DCP. The picture track file essence is compressed using JPEG 2000 and the Audio Track File carries a 24-bit linear PCM uncompressed multichannel WAV file.

Encryption is conventionally applied to the essence of a track file prior to distribution to protect it from unauthorized use, and then decryption is used at the cinema in order to play the composition. A set of decryption keys is provided in the form of a Key Delivery Message (KDM). Forensic marking also takes place, with picture and sound marked with time-of-day and location information. All secure processes take place in real time in secure hardware, such that unencrypted picture and sound data are never stored in user-accessible local data storage. The processor where decryption, decompression, and forensic marking takes place is referred to as a Media Block. Where the Media Block is integrated within a projector, it is known as an integrated media block (IMB).

In a conventional multi-screen digital cinema, decryption keys for all screens must be ingested (loaded and decrypted) by an IMB at each screen (each cinema auditorium is often referred to as a "screen", each of which includes at least one display device, such as a projector, and audio processor) The management of multiple screens requires the capability to schedule shows, manage content and keys, centrally store content and keys for later movement over a network to a screen, and the ability to monitor the status and health of the system). Each KDM is a package of decryption keys that are targeted for the projection hardware (IMB, projector, etc.) on a single screen for a particular piece of content and are valid for a limited time. These KDMs must be managed to ensure they are delivered to the correct screen. The KDM enables playback of a specific DCP during a specific time window by an IMB identified by its serial number during the authoring process. Currently, this management of KDMs is generally either done by hand by the cinema staff, or through a networked device called a Theatre Management Server (TMS).

The purpose of an IMB is to convert DCP content into data that ultimately produces picture and sound in a theater. The IMB is integrated directly into the projector, which ingests image data from a server (e.g. via a cat 6 Ethernet connection or a locally connected Hard drive), and decrypts, decodes (decompresses) and then watermarks the content before playback via the projector. Upon ingestion, Key Delivery Messages (KDMs) are stored on flash memory in the IMB. IMBs also contain a secure clock that is set in the factory and cannot be altered by the end user, outside of a very limited range defined by Digital Cinema Initiative (DCI) standards which the IMB uses to enforce the date/time playback restrictions in the KDM. IMBs also include anti-tamper devices, designed to self-destruct the unit if unauthorized modification of its hardware, software or secure clock is attempted.

The decryption process requires keys for decrypting the cinema content to be stored in plain text on the IMB. If exposed, these keys could be used to create a perfect copy of the cinema content (pirated content). Therefore, physical security (e.g. FIPS 140-2 Level 3; FIPS 140-3 Level 3 or other existing or future standards) is conventionally applied to the IMB to ensure that the secret private keys are not exposed during a security attack on the IMB.

The FIPS 140 series of standards are issued by the National Institute of Standards and Technology (NIST) to coordinate the requirements and standards for cryptography modules that include both hardware and software components, and in particular to maintain the confidentiality and integrity of the information protected by the module. This series of standards specify the security requirements that must be satisfied by a cryptographic module. The standards provide four increasing qualitative levels of security intended to cover a wide range of potential applications and environments.

For example, FIPS 140-2 Level 3 includes tamper-evident physical security mechanisms and prevents and intruder from gaining access to critical security parameters (CSPs) held within the cryptographic module. Physical security mechanisms required at Security Level 3 are intended to have a high probability of detecting and responding to attempts at physical access, use or modification of the cryptographic module. The physical security mechanisms may include the use of strong enclosures and tamper-detection/response circuitry that zeroes all plaintext CSPs when the removable covers/doors of the cryptographic module are opened.

FIPS 140-2 Level 3 physical security requires that an IMB provide a physical security boundary that is constantly monitored, even when unpowered, such that if a security attack is detected, the decryption key and security credentials are immediately and permanently erased. These extensive security requirements, as well as the associated certification testing, results in an IMB being a large, complex, and expensive device.

The security environment and electrical interfaces required in a cinema projector to support an IMB is known as a Type 2 Secure Processing Block (SPB2) and is defined by a studio consortium known as Digital Cinema Initiatives (DCI). Projectors must undergo a certification test defined by DCI to ensure the security and electrical interfaces required. Designing projectors for this and undergoing the compliance testing is very expensive. This results in cinema projectors being much more expensive than "regular" projectors of equivalent brightness. Furthermore, the SPB2 environment takes more volume than a regular projector.

Also, since playback of cinema content is done in real-time by reading the content from a mass storage device, sending it through the IMB to decrypt and decode the content, and then display the content on the projector, and because cinema content is very large (a feature length film is typically over 250 GB), there needs to be a large faulttolerant storage device for each IMB. This storage device must be very reliable, and requires redundancy, usually provide by a RAID array.

The following prior art is relevant to this disclosure: US20130132729A1 and U.S. Pat. No. 6,812,994.

The description above is presented as a general overview of related art in this field and should not be construed as an admission that any of the information it contains constitutes prior art against the present patent application.

SUMMARY

According to an aspect of this disclosure, a distributed media player is set forth having a central playout server that includes a multiplexed media processing block for ingesting and watermarking media data received from a content provider, and a plurality of display devices, such as projectors, each including a decoder for receiving and decrypting the media data from the distributed media player.

The multiplexed media processing block accommodates the traditional functionality of an IMB residing in each projector, and supports the decryption, decompression and watermarking of content before being played in real time at the display device.

The distributed media player set forth herein eliminates the need for a complicated, expensive internal media block (IMB) at each display device since the decryption and watermarking of the content takes place on the central playout server. Additionally, because the content storage is located at the central playout server, there is no need for large amounts of content storage at each display device.

Systems and methods for distribution of digital audio and video content are provided.

An aspect of the disclosure provides a distributed media player comprising: a central playout server having a multiplexed media processing block within a tamper-responsive enclosure, the central playout server having a first input for receiving at least one decryption key and a second input for receiving media data from a content provider and in response decrypting the media data via the multiplexed media processing block using the at least one decryption key and transmitting the decrypted media data over a local network as an encrypted data stream Another aspect of the disclosure provides a method comprising: receiving encrypted digital content; receiving at least one decryption key; decrypting the encrypted digital content at a central playout server using the at least one decryption key to produce unencrypted digital content; generating an encrypted data stream from the unencrypted digital content; and distributing the encrypted data stream from the central playout server to the plurality of display devices. The details of one or more variations of the subject matter described herein are set forth in the accompanying drawings and the description below. Other features and advantages of the subject matter described herein will be apparent from the description and drawings.

DETAILED DESCRIPTION

To overcome the deficiencies of the conventional approaches, the present disclosure describes devices, systems and methods for distributing digital content. While the present disclosure will be described with respect to distributing media data, such as audio and video content together (e.g. a digital movie), to multiple screens. However, the devices, systems and methods described herein may be used to distribute any playable digital content, including, but not limited to, video content (with or without audio) and audio content (e.g. without video) and the like.

Figure 1:
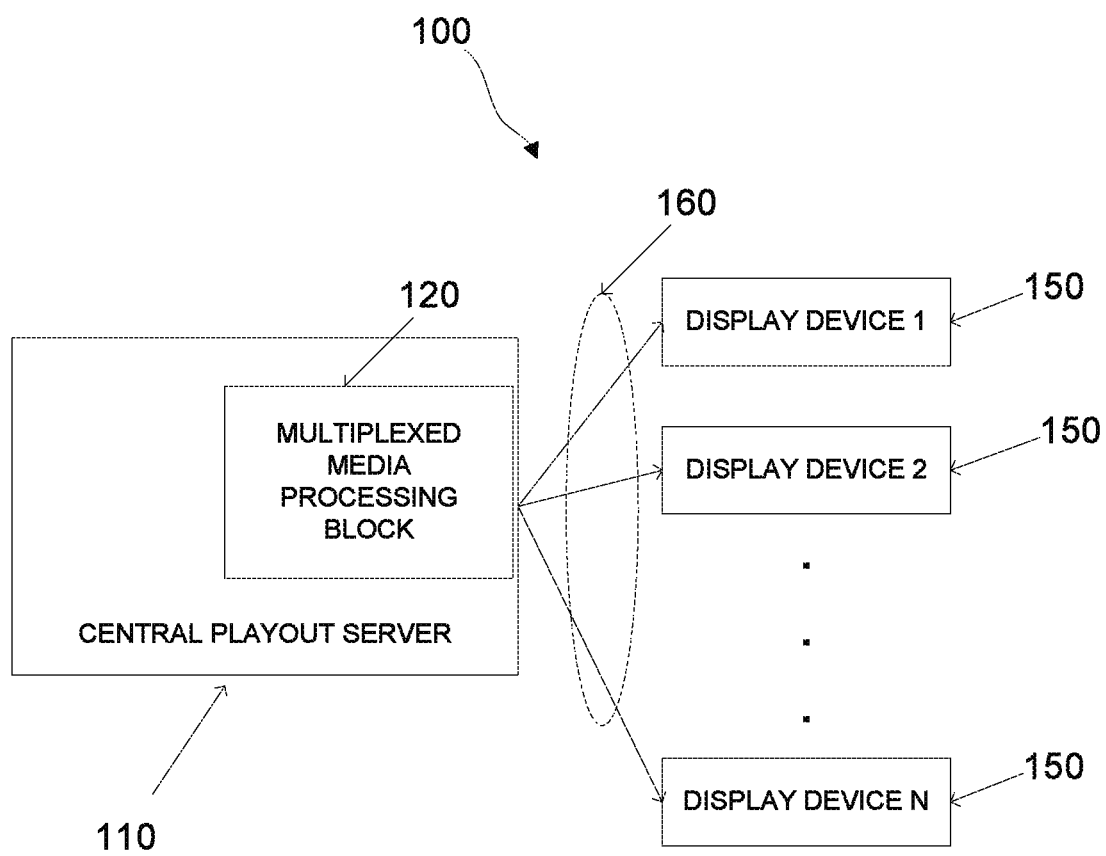
FIG. 1 is a block diagram of a distributed media player, in accordance with an example of the present disclosure.

To illustrate an example of a distributed media player 100, reference is made to FIG. 1. The distributed media player 100 includes a central playout server 110 having a multiplexed media processing block 120 where content, in the form of a Digital Cinema Package (DCP), is located and ingested. Each DCP is encrypted using an encryption algorithm such as the well-known Advanced Encryption Algorithm (AES). AES is a symmetric encryption algorithm that uses a 128-bit key for digital cinema applications. When encrypted, the essence within each track file of the DCP is encrypted with a unique key. The KDM carries an encrypted version of each key used to encrypt the track files within the associated DCP. A KDM is required to unlock and play the DCP. DCPs may be received via satellite or by means of portable storage, such as a hard drive. Once decrypted, the content is stored in local network storage.

In the illustrated example, central playout server 110 essentially functions as a Type 2 Secure Processing Block (SPB2) while the multiplexed media processing block 120 is a single or multiple devices with FIPS 140-2 (or 3) level 3 physical security that effectively multiplexes IMB functionality among the display devices 150.

Before the content can be delivered to the display devices 150, the central playout server 120 must undergo an initialization or configuration process according to the design of the cinema. In particular, the multiplexed media processing block 120 must configure each target screen in memory, according to the KDM and watermark, before it can send content to that screen. Therefore, the multiplexed media processing block 120 must have all display devices 150 configured in its memory so that it knows which display device 150 to send the target content to.

After the initialization process, a key manager within the multiplexed media processing block 120 catalogs received KDMs and matches those to each of a plurality of display devices 150 (e.g. projectors).

All security activities (decrypt/decompress/watermark) take place within the multiplexed media processing block 120, which then distributes the decrypted/decompressed/watermarked content to the display devices 150 at each screen over a local network 160, as an encrypted data stream. The content that is sent as a data stream from the central playout server 110 to each display device 150 can be either compressed or uncompressed.

In one embodiment, SMPTE ST2110 may be used to encrypt the content distributed by the multiplexed media processing block 120 to the display devices 150. In another embodiment, SDVoE may be used. SMPTE ST2110 is a standard developed by the Society of Motion Picture and Television Engineers (SMPTE) for sending digital video over an IP network, while SDVoE (Software Defined Video-over-Ethernet) is a high-performance, software-based AV-over-IP platform for control and distribution of digital content over Ethernet/Fiber networks. Advantageously, only a simple ST2110/SDVoE decoder is required at each display device 150 to decrypt the content, thereby eliminating the need for a complicated, expensive internal media block (IMB) with FIPS 140-2 Level 3 physical security protection at each display device.

Figure 2:
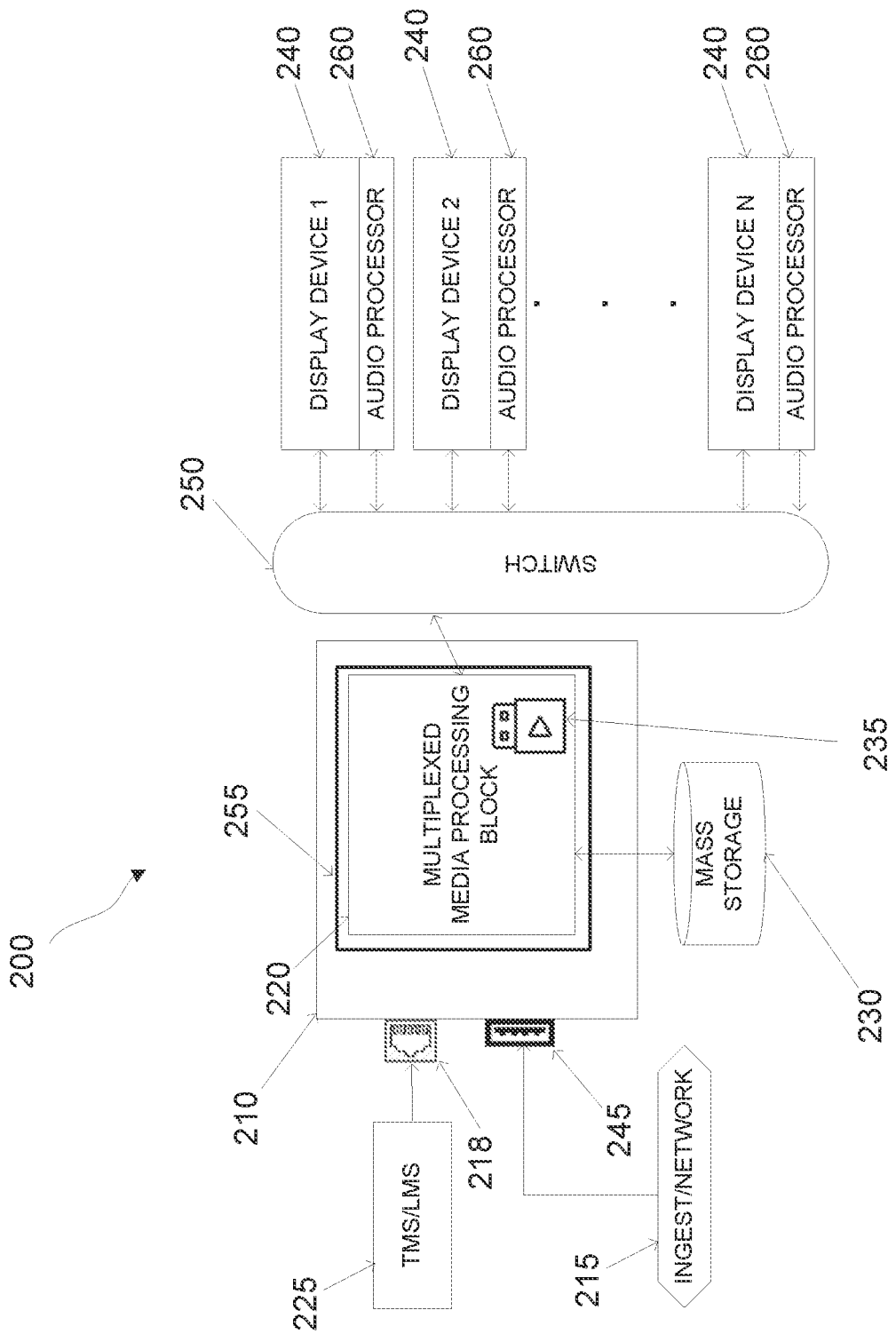
FIG. 2 is a diagram depicting further details of one possible example of the present disclosure.

An exemplary embodiment of a distributed media player 200, according to an aspect of this disclosure, is shown in FIG. 2. The distributed media player 200 includes a central playout server 210 having a multiplexed media processing block 220 for decrypting, decompressing and watermarking content (DCPs) received from an ingest/network 215 via USB port 245. The multiplexed media processing block 220 can, for example, be a secure PCI-X board within central playout server 210. The content may originate from a portable storage, such as a hard drive, satellite or other means and be received via an input such as an Ethernet port 218.

As discussed above, the received DCP content may be encrypted using an encryption algorithm, such as AES, and decoded or decompressed according to the JPEG 2000 standard following the initialization process discussed above, so that the multiplexed media processing block 220 and ST2110/SDVoE decoders conform to the same security model. KDMs for decrypting the content may be received from a Theatre Management Server (TMS) or Library Management Server (LMS) 225 or a flash drive 235 and can be stored, for example, within a mass storage 230 or within the multiplexed media processing block 220. A key manager within the TMS/LMS 225 may catalog the KDMs and match those to each screen or, in the illustrated example the multiplexed media processing block 220 functions as a proxy for the display devices 240 and passes credentials to the TMS/LMS 225 on behalf of the display devices 240. In an embodiment, the TMS interface to multiplexed media processing block 220 receives KDMs over 10Base-T/(IEEE 802.3)/100BASE-TX (IEEE 802.3u)/1000BASE-TX (IEEE 802.3ab) via an input such as a ruggedized Ethernet port 218.

As discussed above, multiplexed media processing block 220 distributes the decrypted/decoded/watermarked content to the display devices 240 at each screen as an encrypted data stream over an SMPTE ST 2110 media network switch 250. In one embodiment, media network switch 250 comprises a ST2110/AMWA NMOS Professional Media Network Interface Port for transporting the encrypted content over copperor optical fibres.

Associated audio content (e.g. compliant with DCI DCSS v1 supporting up to 16 channels of 24-bit Linear PCM AES/EBU audio at sample rates of 48 KHz or 96 KHz) is transmitted over the switch 250 to a plurality of audio processors 260. The audio may also include immersive audio bitstreams as defined by the SMPTE 2098 suite of standards. As the processing of the audio and visual data contained within a DCP is being processed at a single location, the conformation of the audio signals may also be performed in this process thereby eliminating the need for additional expensive audio peripheral equipment at each screen. Therefore, the system described herein also supports the discrete transport of audio as an AES 67 compliant data that can be directly assigned to a specific B-Chain system of an audio processor 260.

The multiplexed media processing block 220 is enclosed within a tamper-responsive enclosure 255. The tamper-responsive enclosure 255 is constructed so as to comply with FIPS 140-2 Level 3 physical security, and may include one or more physical and/or electrical security mechanisms for detecting and/or preventing unauthorized access to components located in the tamper-responsive enclosure 255, including, but not limited to, cryptographic keys stored in multiplexed media processing block 220. For example, when an attempted unauthorized access is detected, at least the cryptographic keys stored in multiplexed media processing block 120 may be deleted Attention is now directed to FIG. 3 which depicts a flowchart of a method 300 for distributing digital content, according to non-limiting examples. In order to assist in the explanation of the method 300, it will be assumed that the method 300 is performed using the distributed media player 200 of FIG. 2, for example by multiplexed media processing block 220 and a controller and/or processor and/or FPGA, and the like, of the display device 240. However, it is to be understood that the distributed media player 200 and/or systems described herein and/or the method 300 can be varied and need not work exactly as discussed herein in conjunction with each other, and that such variations are within the scope of present examples.

Regardless, it is to be emphasized, that the method 300 need not be performed in the exact sequence as shown, unless otherwise indicated; and likewise, various blocks may be performed in parallel rather than in sequence; hence the elements of the method 300 are referred to herein as "blocks" rather than "steps".

Figure 3:
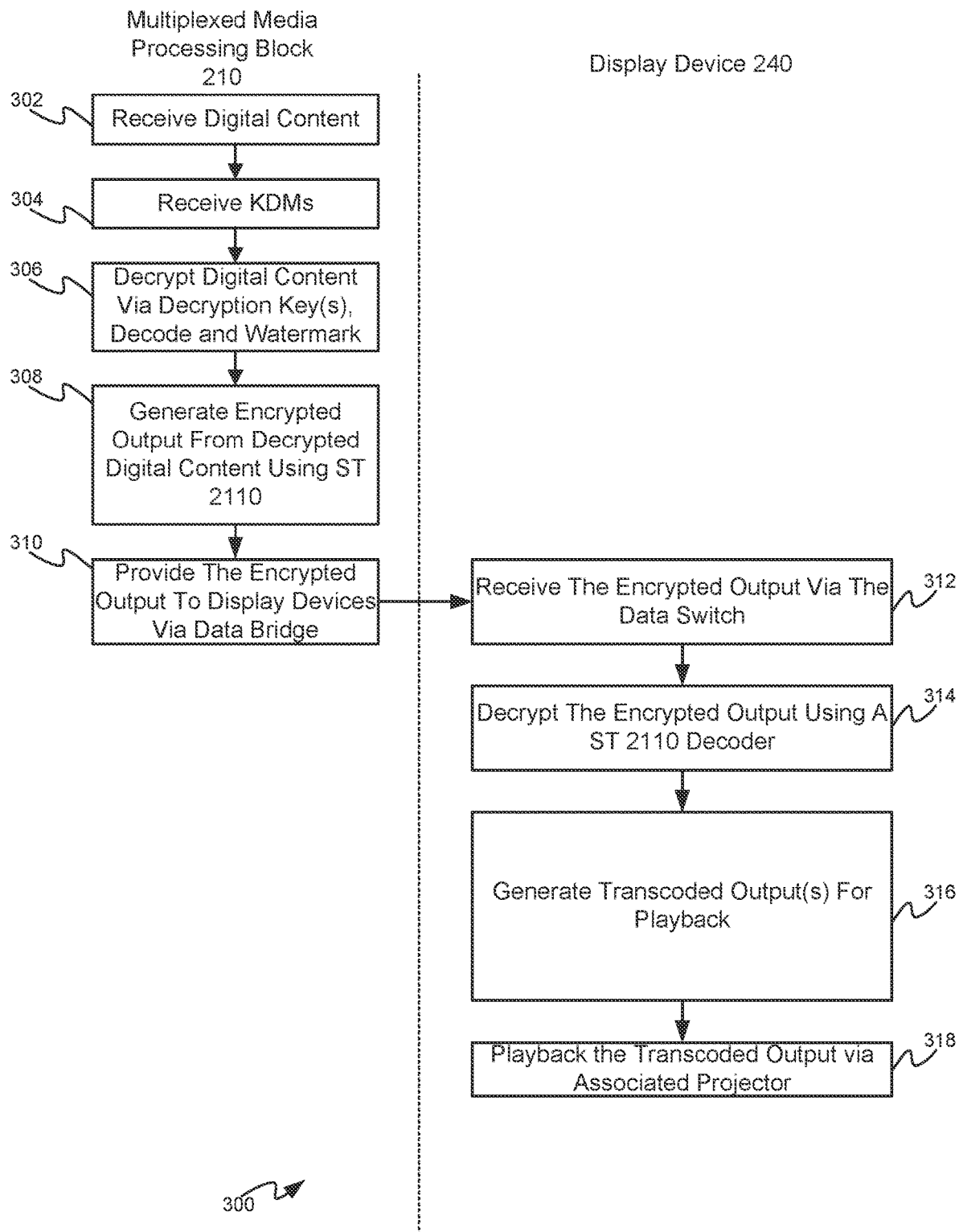
FIG. 3 depicts a flowchart of a method of operating a distributed media player, in accordance with examples of the present disclosure.

Furthermore, blocks on the "left" side of FIG. 3 are understood to be performed by the multiplexed media processing block 220, and blocks on the "right" side of FIG. 3 are understood to be performed by the display device 240.

At a block 302, the multiplexed media processing block 220 receives digital content, for example from ingest/network 215.

At a block 304, the multiplexed media processing block 220 receives one or more KDM messages from the RJ-45 connector to TMS/LMS 220 or from USB flash drive 235 for decrypting the encrypted digital content.

At the time of playback, at block 306, the multiplexed media processing block 220 decrypts the encrypted digital content using the KDMs to produce unencrypted digital content and decodes the unencrypted content using JPEG 2000 decoding.

At block 308, the multiplexed media processing block 220 generates encrypted output from the unencrypted digital content applying encryption before transporting the data using the SMPTE ST 2110 standard. Optionally, the multiplexed media processing block 220 may then add watermarking of the video and/or audio for forensic marking.

For example, at block 308, the multiplexed media processing block 220 may further combine the digital content from the JPEG 2000 decoding (which may or may not be forensically marked), and audio channel mapping (which may or may not be forensically marked), and decrypted timed text (e.g. subtitles).

Thus, the multiplexed media processing block 220 may be configured to generate encrypted output from digital content by: receiving digital content from in an encrypted and compressed format; decrypting the digital content using a decryption key (e.g. an AES key) and decoding (decompressing) to generate unencrypted digital content; and re-encrypting the unencrypted digital content again before transporting over ST 2110 (or alternatively SDVoE).

At a block 310, the multiplexed media processing block 220 provides, to the display devices 240 and audio processors 260, via the data switch 250, the encrypted output.

At a block 312, a display device 240 receives the encrypted output via the data switch 250.

At a block 314, the display device 240 decrypts the encrypted output received from the media block 402 using a ST 2110 (or alternatively SDVoE) decoder.

At a block 316, the display device 240 generates respective transcoded outputs for playback of the content via an associated projector (block 318).

In summary, the distributed media player 100 or 200 eliminates the need for a complicated, expensive internal media block (IMB) at each display device 150/240 since the decryption and watermarking of the content takes place within the central playout server 110/210. Additionally, because the content storage is located at the central playout server within mass storage 230, there is no need for large amounts of content storage at each display device.

In this disclosure, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this disclosure, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A system comprising:
a distributed media player including:
a central playout server having a multiplexed media processing block within a tamper-responsive enclosure, the central playout server having a first input for receiving at least one decryption key and a second input for receiving media data from a content provider and in response decrypting the media data via the multiplexed media processing block using the at least one decryption key and transmitting the decrypted media data over a local network as an encrypted data stream,
a plurality of display devices, wherein each display device includes a decoder for decrypting the encrypted data stream and a projector for displaying the media data on a screen; and
a media network switch for distributing the encrypted data stream to the plurality of display devices.

2. The distributed media player of the system of claim 1, further including a flash storage within the tamper-responsive enclosure for storing the at least one decryption key.

3. The distributed media player of the system claim 1, wherein SMPTE ST2110 is used to transmit the encrypted data stream.

4. The distributed media player of the system of claim 1, wherein SDVoE is used to transmit the encrypted data stream.

5. The distributed media player of the system of claim 1, wherein the tamper-responsive enclosure is constructed so as to comply with FIPS 140-2 Level 3 physical security.

6. The system of claim 1, wherein media network switch comprises a ST2110 media network interface port for streaming distributing the encrypted data stream over the local network.

7. The system of claim 1, further including an audio processor associated with each display device.

8. The system of claim 1, wherein the decrypted media data are watermarked prior to being distributed to the plurality of display devices.

9. A method comprising:
receiving encrypted digital content;
receiving at least one decryption key;
decrypting the encrypted digital content at a central playout server using the at least one decryption key to produce unencrypted digital content;
generating an encrypted data stream from the unencrypted digital content;
distributing the encrypted data stream from the central playout server to a plurality of display devices,
receiving the encrypted data stream at one of the plurality of display devices;
decrypting the encrypted data stream via a decoder at one of the plurality of display devices and in response generating respective transcoded outputs representing the digital content; and
playing back the digital content via a projector.

10. The method of claim 9, wherein the unencrypted digital content is decoded before generating the encrypted data stream.

11. The method of claim 9, wherein the unencrypted digital content is watermarked before generating the encrypted data stream.

12. The method of claim 9, wherein the encrypted data stream is transmitted using SMPTE ST 2110.

13. The method of claim 9, wherein the encrypted data stream is transmitted using SDVoE.

\* \* \* \* \*